CLINGER & CREMER.
Straw Cutter.
No. 20,038. Patented April 27, 1858.
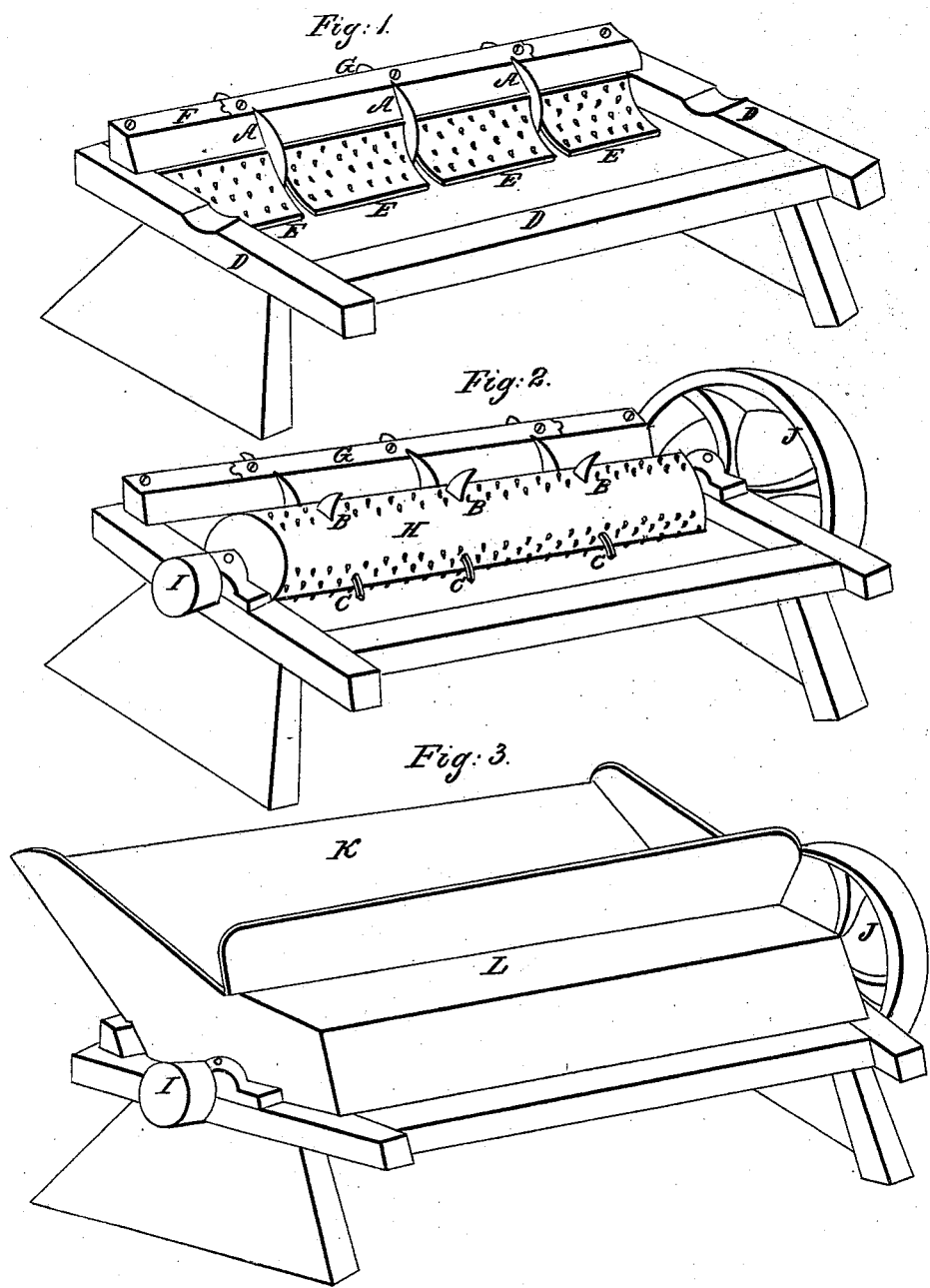

UNITED STATES PATENT OFFICE.

P. S. CLINGER AND C. CREMER, OF CONESTOGA CENTER, PENNSYLVANIA.

STRAW AND STALK CUTTER.

Specification of Letters Patent No. 20,038, dated April 27, 1858.

*To all whom it may concern:*

Be it known that we, PETER S. CLINGER and CYRUS CREMER, both of Conestoga Center, in the county of Lancaster and State of Pennsylvania, have invented a new and useful Machine for Cutting and Crushing Corn and other Stalks; and we hereby declare that the following is a full, clear, and exact description of the construction and operation of the same, reference being had to the annexed drawings, and letters of reference marked thereon, making part of this specification.

D, D, D, Figure 1, is a representation of a frame, at the back of which are four metallic concave plates E, E, E, E, firmly attached to and level with the frame, (D).

F is a bar, (secured to the frame D,) in which are three slots to receive the convex knives A, A, A, which are held firmly in the required position by means of a metallic plate G.

In Fig. 2, H is a revolving cylinder upon which are fixed the knives B, B, B, or spikes C, C, C or both combined; also a number of teeth, (corresponding with the teeth on the concaves E, E, E, E, in Fig. 1).

I is a pulley by which to revolve the cylinder.

J, is a balance wheel.

K and L, is a trough (to guide the stalks to the knives) and a cover for the cylinder.

The manner in which to work the above described machine, is, first to cause the cylinder to revolve by means of a belt running around the pulley (I,) from a horse or other power, then take a bundle of stalks and drop them lengthwise (three or four at a time) into the trough K, from whence they will fall on the stationary knives A, A, A, Fig. 1, and by the action of the knives B, B, B or spikes C, C, C, Fig. 2, on the revolving cylinder, each stalk will be cut into four parts, and each part will then fall on the concave beneath, and by the action of the teeth (on the revolving cylinder) and the teeth in the concaves, the stalks will be torn apart in the direction of the fiber, and will be delivered beneath the machine, in the best condition as food for cattle.

We do not claim the invention of a revolving cylinder or stationary concaves with knives, teeth or spikes, but we are not aware that they have ever before been combined for the purpose specified.

Therefore, what we claim as our invention, and desire to secure by Letters Patent is, The revolving toothed cylinder H, armed with knives B, and spikes C, in combination with the stationary knives A and toothed concave E, constructed to operate conjointly as, and for the purpose set forth.

PETER S. CLINGER.
CYRUS CREMER.

Witnesses:
H. MEHAPPY,
JOHN CLARK.